May 4, 1943.     J. A. DODD     2,318,066
HYDRO-PNEUMATIC TANK
Filed Sept. 13, 1940

John A. Dodd, Inventor

By Beaman & Langford
Attorneys

Patented May 4, 1943

2,318,066

UNITED STATES PATENT OFFICE 2,318,066

HYDROPNEUMATIC TANK

John A. Dodd, Atlanta, Ga.

Application September 13, 1940, Serial No. 356,598

4 Claims. (Cl. 103—6)

The present invention relates to hydro-pneumatic tanks, and more particularly to a control for maintaining therein the proper volume of air in relation to the volume of water.

In water systems wherein water automatically is pumped intermittently as required into a relatively small tank for storage under pressure and maintained under pressure by a body of air, it is necessary for proper and economical operation to employ in the tank a volume of air having a given relation to the volume of water. Should there be too great a proportion of air the water capacity of the tank is made too small and if there is too great a proportion of water, the pressure falls off too quickly as the water is drawn from the tank. Due to the fact that water is drawn from the small storage tank intermittently, and also to the fact that air above the water is absorbed thereby, there is encountered a problem of considerable difficulty to maintain the proper relation between the volume of water in relation to the volume of air under all conditions of operation. The problem is further complicated by the fact that the water level in the tank varies within limits during use. According to the present invention the air pressure control is under the control of the water supply control as well as the pressure of the air in the tank.

An object of the invention is to provide a combination air pressure and water level control, which automatically supplies air to a hydro-pneumatic tank as air is needed to maintain a desired volume of air in relation to the volume of water.

Another object of the invention is to control the air supply by the water level and the pressure of the air in the tank.

Still another object of the invention is to provide an electrical control system for maintaining the water level in a hydro-pneumatic tank between a predetermined maximum and minimum level and to operate air supplying means in relation to the water level maintaining means.

Figure 1:
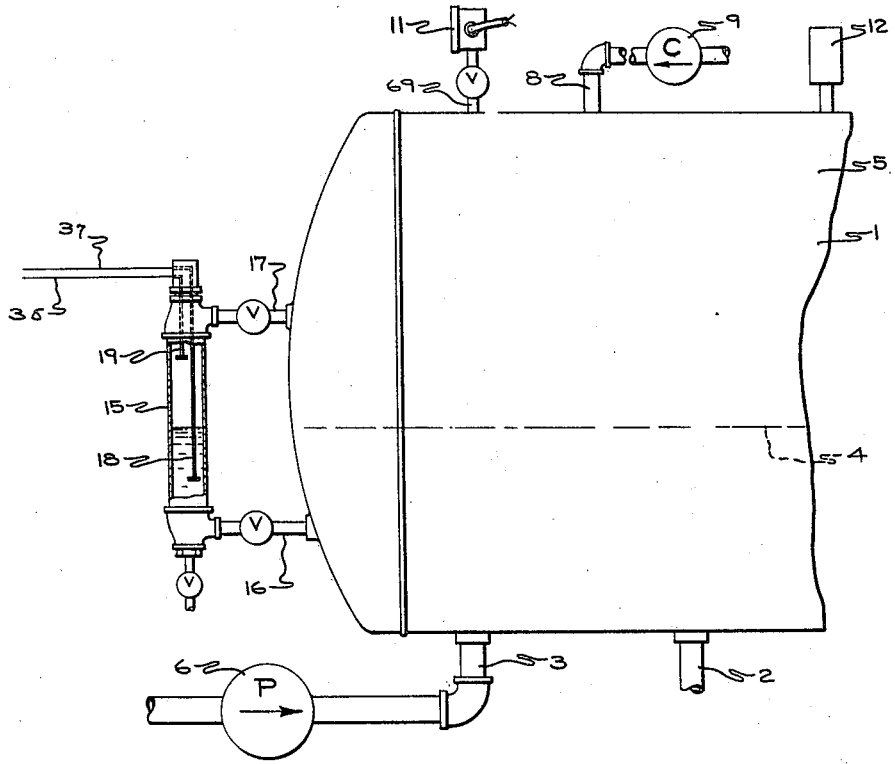
Figure 2:
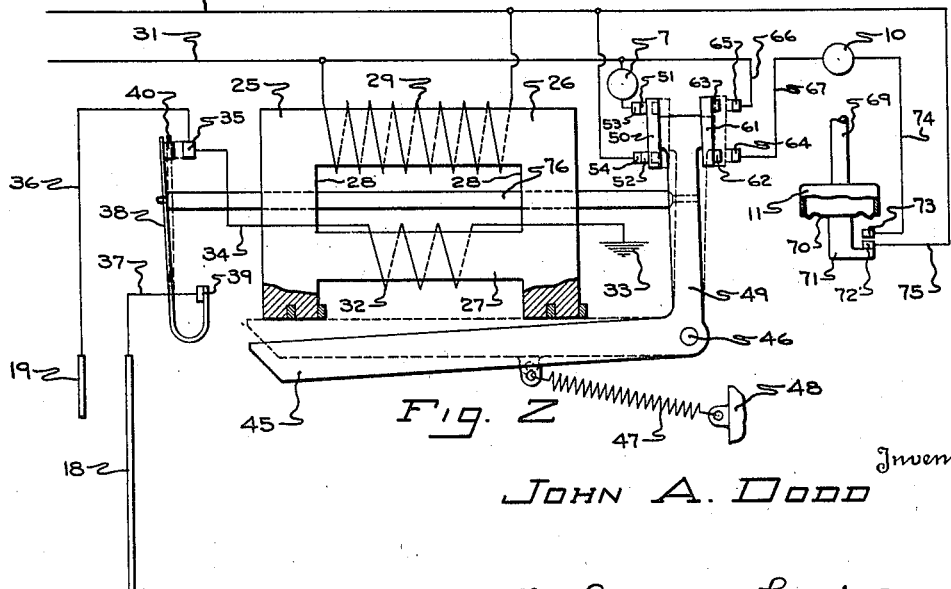

These and other objects residing in the arrangement, combination, and construction of parts will be apparent from the following specification when taken with the accompanying drawing, in which:

Fig. 1 is a view partly diagrammatic disclosing a hydro-pneumatic tank according to the present invention, parts of the structure associated therewith being shown diagrammatically and, Fig. 2 is a diagrammatic illustration of the electrical circuit.

Referring to the drawing, the reference character 1 indicates a tank provided with an outlet pipe 2 and an inlet pipe 3. The tank 1 is for storing and delivering under pressure a liquid, usually, but not necessarily, water. However the liquid should be a conductor of electricity. Liquid in the tank 1 reaches a level 4 as shown. Above the level 4 is an air space 5.

The inlet 3 is connected to a pump 6 which is driven by a motor 7 disclosed in Fig. 2. Communicating with the air space 5 of the tank 1 is an air inlet conduit 8 which is connected to a compressor 9, driven by a motor 10, disclosed in Fig. 2. It will be understood that the compressor 9 and its motor 10 may have substituted therefor an electrically operated valve for directing the air under pressure from a suitable source into the conduit 8, and also that the quantity of air delivered be within a range which will permit the system to cycle as hereinafter described. Also communicating with the air space 5 of the tank 1 is a pressure responsive switch 11, shown in Fig. 1 and diagrammatically illustrated in Fig. 2. The pressure responsive switch 11 is for controlling the inlet of air into the chamber 5 when the pressure therein falls below a predetermined maximum, although as hereinafter explained, its circuit is open while the motor 7 is in operation. A safety relief valve 12 may be provided, if desired, to communicate with the air space 5.

Disposed at one side of the tank 1 is an auxiliary tube 15, communicating with the tank 1 at the bottom thereof, through a pipe 16, and at the top thereof, through a pipe 17 in a manner that will be understood by those skilled in the art. Disposed within the tube 15 is a long electrode 18 and a short electrode 19. The electrodes 18 and 19 are insulated from each other and from the tube 15. Also, they are provided with connecting wires 37 and 36 respectively. It will be understood that the liquid level 4 within the tank 1 will be the liquid level within the tube 15, due to the communication with the tube 15 provided by the pipes 16 and 17. The electrodes 18 and 19 are for the purpose of controlling through the circuits disclosed in Fig. 2 the level 4 of the liquid within the tank 1.

Referring particularly to the wiring diagram in Fig. 2, there is disclosed a relay for controlling the operation of the pump motor 7 and the compressor motor 10. The relay consists of a magnetic core 25 having a cross piece 26 and another cross piece 27. Legs 28 connect the cross pieces 26 and 27 and constitute magnetic poles.

A primary coil 29 is disposed about the cross piece 26 and is permanently connected across the electric wires 30 and 31 connected to a source of electric current, while the apparatus is in operation. Disposed about the cross piece 27 is a reaction coil 32, which is grounded at one end as at 33. The opposite end is connected by a conductor 34 to a contact 35, which is in turn connected by a conductor 36 to the short electrode 19, which as disclosed in Fig. 1 is disposed in the tube 15. The long electrode 18 associated with the short electrode 19 in the tube 15 is connected by a conductor 37 to a movable switch arm 38. Preferably the switch arm 38 is resilient and it has one end 39 thereof fixed. At the opposite end of the switching arm 38 there is provided a contact 40 for engagement with the contact 35.

An armature 45 pivoted at 46 is arranged for association with the legs or poles 28 and is pivoted away from the poles 28 by the action of a spring 47, anchored to a fixed point 48. The armature 45 carries a switching arm 49 provided with a conducting bridging member 50 on which there are arranged contacts 51 and 52. Disposed in the path of movement of the contacts 51 and 52 are contacts 53 and 54 respectively. The contact 54 is connected directly to the main line conductor 30 and the contact 53 is connected to the main line conductor 31 through the pump motor 7. In the position shown with the armature 45 away from the poles 28, under the action of the spring 47, the bridging member 50 completes the pump motor 7 circuit, through the main line conductor 30, the contact 54, the contact 52, the bridging member 50, the contact 51, and the contact 53. Thus, as the armature 45 moves toward and away from the poles 28, the pump motor 7 circuit is opened and closed respectively.

Also connected to the switching arm 49 is a conducting bridging member 61, provided with contacts 62 and 63. Disposed in the path of movement of the contacts 62 and 63 are contacts 64 and 65 respectively. The contact 65 is connected to the main line conductor 31 by a conductor 66 and the contact 64 is connected to the compressor motor 10 by a conductor 67.

The pressure responsive switch 11 is diagrammatically shown as comprising a chamber communicating with the air space 5 through a conduit 69, and a pressure responsive diaphragm 70. The diaphragm 70 has connected thereto an arm 71 movable therewith and on which is mounted a contact 72. Associated therewith and in the path of movement of the contact 72 is a fixed contact 73. The contacts 72 and 73 are spaced so that when the air pressure in the air space 5 of the tank 1 falls below a predetermined maximum, the contact 72 is moved into engagement with the contact 73.

The compressor motor 10 is connected by a conductor 74 to the contact 73 and the contact 72 is connected to the main line conductor 30 by a conductor 75. Thus, as the switching arm 49 moves under the action of the armature 45, to the right as shown in Fig. 2, the compressor motor 10 circuit is closed, the circuit including the main line conductor 31, the conductor 66, the contacts 65 and 63, the bridging member 61, the contacts 62 and 64, the conductor 67, the compressor motor 10, the conductor 74, the contacts 73 and 72 of the pressure responsive switch 11, the conductor 75, and the main line conductor 30. It will be understood that as the armature 45 moves toward and away from the poles 28, the bridging member 61 moves respectively to close and open the compressor motor 10 circuit.

For moving the switching arm 38 in timed relation with the switching arm 49, there is provided a connecting link 76, it being understood that the general arrangement of all the contacts disclosed is that when the contacts 52 and 54, and 51 and 53 are closed, the contacts 40 and 35 are opened, and the contacts 63 and 65, and 62 and 64 are open. Also, when the contacts 52 and 54, and 51 and 53 are open, the contacts 40 and 35, the contacts 63 and 65, and the contacts 62 and 64 are closed.

The control device is designed particularly for use with alternating current and in this regard, the use of alternating current eliminates electrolytic action which would otherwise be set up within the tube 15 by the use of direct current. Also, it will be understood that while the liquid in the tank 1 may be other than water, within the scope of the present invention, nevertheless when water is used, there are sufficient impurities therein to make the same a conductor of electricity and therefore render the control device operative.

In the operation of the device, the primary coil 29 being constantly energized continuously sets up an alternating magnetic flux. The cross piece 27 constitutes a shunt for the flux with the result that most of the flux passes in a path across the cross piece 27. While some flux may leak across the ends of the poles 28 the amount will be insufficient to attract the armature 45. In the position shown, the liquid level is above the bottom of the long electrode 18 and below the bottom of the short electrode 19. Also, the circuit of the pump motor 7 is closed so that the pump is pumping liquid into the tank 1. As the liquid level 4 in the tank rises it will eventually come into contact with the short electrode 19. This will complete a circuit through the conductor 36, the contact 35, the conductor 34, through the reaction coil 32 to the ground and through the ground to the water and the short electrode 19. Electric current is then induced into the circuit of the coil 32 and the effect of this current is to set up a magnetic reaction to the flow of magnetic flux through the cross piece 27. Accordingly, the flux set up by the coil 29 seeks another path, and this path is across the poles 28 of the core 25. This flux seeking a path across the poles 28 is strong enough to attract the armature 45 and move the same to its dotted line position as shown in Fig. 1, opening the pump motor 7 circuit by separating the contacts 52 and 51 from the contacts 54 and 53, and closing the compressor motor 10 circuit by engaging the contacts 62 and 63 with the contacts 64 and 65, provided that the pressure responsive switch 11 is closed. The closing of the compressor motor 10 circuit starts the entrance of air into the air space 5 of the tank 1 if the pressure in the tank 1 is below a predetermined maximum, since the compressor motor 10 circuit also includes the pressure responsive switch 11. Assuming that the pressure in the tank 1 is below the predetermined maximum for which the pressure responsive switch 11 is set, and the contacts 72 and 73 are therefore in engagement, the compressor motor 10 circuit will remain closed until the air pressure in tank 1 reaches the predetermined maximum and the contacts 72 and 73 separate, or until the armature 45 is moved away from the poles 28 to start the pump motor 7 by closing its circuit through the contacts 52 and 54, and 51 and 53, and the contacts 62 and 63 are separated from the contacts 64 and 65 in the compressor motor 10 circuit.

As explained hereinabove, when the rising liquid level reaches the bottom of the electrode 19, the circuit of the reaction coil 32 is closed through the conductor 36, the contact 35, the conductor 34 and the ground at 33, with the result that the armature 45 is drawn to the end of the poles 28. As the armature 45 is drawn against the end of the poles 28, the switching arm 49 moves to actuate the link 76 to draw the switching arm 38 to the right as shown in Fig. 2 to engage the contact 40 with the contact 35. Engagement of the contacts 40 and 35 results in closing the reaction coil 32 circuit through the liquid in the tank 1 to the ground, the electrode 18, the connector 37, the switching arm 38, the contacts 40 and 35, and the conductor 34 through the coil 32 to the ground. Thus, when the liquid level 4 in the tank 1 drops below the bottom of the electrode 19, the reaction coil 32 circuit will remain closed through the last named circuit until the liquid level 4 drops below the level of the electrode 18, to break the connection between the electrode 18 through the liquid in the tube 15 to the ground. When this circuit, which constitutes a holding circuit, is broken, the shunt constituted by the cross piece 27 is no longer choked, since there is no reaction set up by the coil 32 and the magnetic flux set up by the coil 29 passes through the cross piece 27 permitting the armature 45 to move away from the poles 28 and to be drawn to its full line position by the spring 47. The result is that the contacts 54 and 53 are engaged by the contacts 52 and 51 to close the pump motor 7 circuit to start the pump, and the contacts 62 and 63 are moved away from the contacts 64 and 65 to open the compressor motor 10 circuit to stop the action of the compressor, should the compressor motor 10 circuit have not already been opened by the separating of the contacts 72 and 73 under the action of the pressure responsive switch 11.

It will be understood that while I disclose one form of relay 25, that other relays accomplishing the same result may be employed, inasmuch as the specific form of the relay employed forms no part of the present invention. Furthermore, the pump is to be considered broadly as to cover an injector or even a valve for closing and opening a conduit from a pump or gravity feed.

Having thus described my invention, what I desire to secure by Letters Patent and claim is:

1. An air volume control for a hydro-pneumatic tank comprising means to maintain the level of the liquid in the tank between a predetermined maximum and minimum level, means to direct air under pressure into the tank to maintain an air space over the liquid in the tank, said air directing means being under control of means to render the same operative when the liquid in the tank reaches its maximum level and during the time the liquid in the tank is between its maximum and minimum levels following the liquid reaching its maximum level, and to render the same inoperative when the liquid in the tank reaches its minimum level, and also being under the control of pressure responsive means operatively connected to the tank for limiting the air pressure in the tank to a predetermined maximum.

2. An air volume control for a hydro-pneumatic tank comprising electrically controlled means to maintain the level of liquid in the tank between a predetermined maximum and minimum level, electrically controlled means to direct air under pressure into the tank, pressure responsive means operatively connected to the tank for limiting the air pressure in the tank to a predetermined maximum, an electric circuit including said liquid level maintaining means, said air directing means, and said pressure responsive means, means responsive to the liquid level in the tank for controlling said circuit for maintaining the liquid level in the tank between a predetermined maximum and minimum and for rendering operative said air directing means when the liquid level in the tank reaches said maximum, subject to the control of said pressure responsive means, and a holding circuit for maintaining said air directing means operative subject to the control of said pressure responsive means during the time the liquid level is dropping from said maximum to said minimum level.

3. A hydro-pneumatic system comprising a tank, a pump for replenishing the supply of a liquid in the tank, automatic means for controlling the operation of said pump to start the operation of said pump when the liquid level therein falls below a predetermined point and to stop the operation of said pump when the liquid level therein rises to a predetermined point, means to direct air under pressure into said tank to maintain an air space over the liquid in said tank, an operative connection between said air directing means and said controlling means for starting the operation of said air directing means when said pump stops upon the liquid in the tank reaching its maximum level and for stopping the operation of said air directing means when said pump starts upon the liquid in the tank reaching its minimum level, and pressure responsive means operatively connected to the tank for stopping the air directing means while the pressure in the tank is at or over a predetermined maximum, said air directing means being operative at all times between said pump stopping and starting points except when interrupted by said pressure responsive means.

4. In a device of the character described, a closed liquid container, a pump for pumping liquid into said container, means to draw liquid from said container, a pump circuit for said pump, an air compressor for increasing the air pressure in said container, a compressor circuit for said compressor, a pressure responsive switch in said compressor circuit responsive to the pressure in said container, means to close said pump circuit at one predetermined liquid level in said container and to open said pump circuit at a second predetermined liquid level in said container, said means opening said pump circuit closing said compressor circuit subject to the operation of said pressure responsive switch, and a holding circuit for holding said compressor circuit closed subject to said pressure responsive switch and said pump circuit open until said first named liquid level is reached.

JOHN A. DODD.